2
Sheet 1 - 2 Sheets.
C. C. Bellows.
Dressing & Finishing Leather.
No. 2685. Reissued Jul. 16. 1867.
Fig: 4.
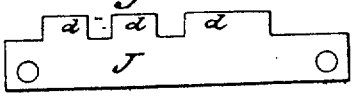
Fig: 2.
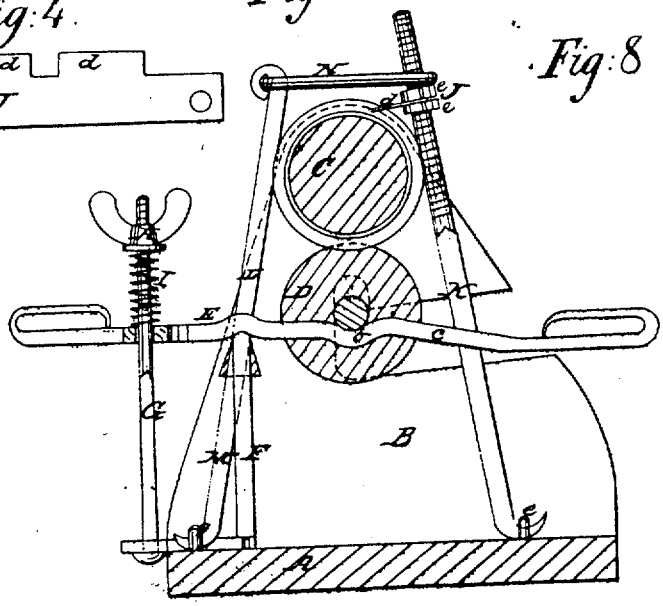
Fig: 7.
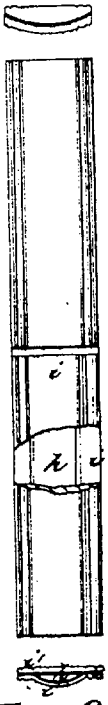
Fig: 8
Fig: 9.
Fig: 5.
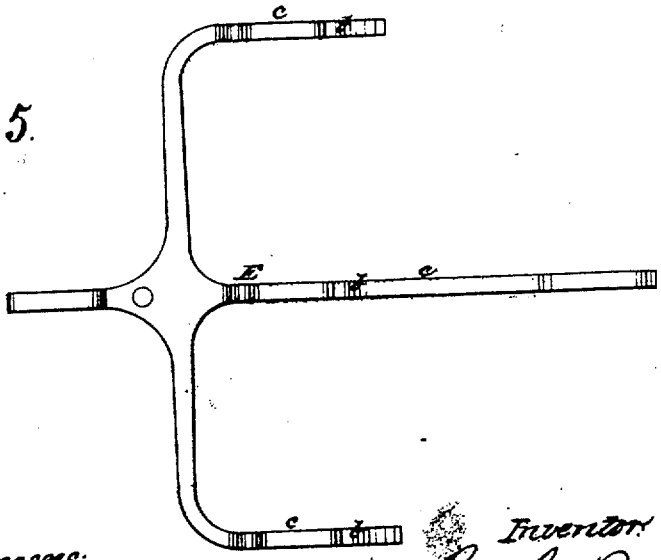
Witnesses:
J. A. Jackson.
Wm. Treum
Inventor:
C. C. Bellows
Per Munn & Co
Attys.

Sheet 2 2 Sheets
C. C. Bellows.
Dressing & Finishing Leather.
Fig: 10 Fig: 11.
Reissued Jul. 16. 1867.
No. 2685.
Fig: 1
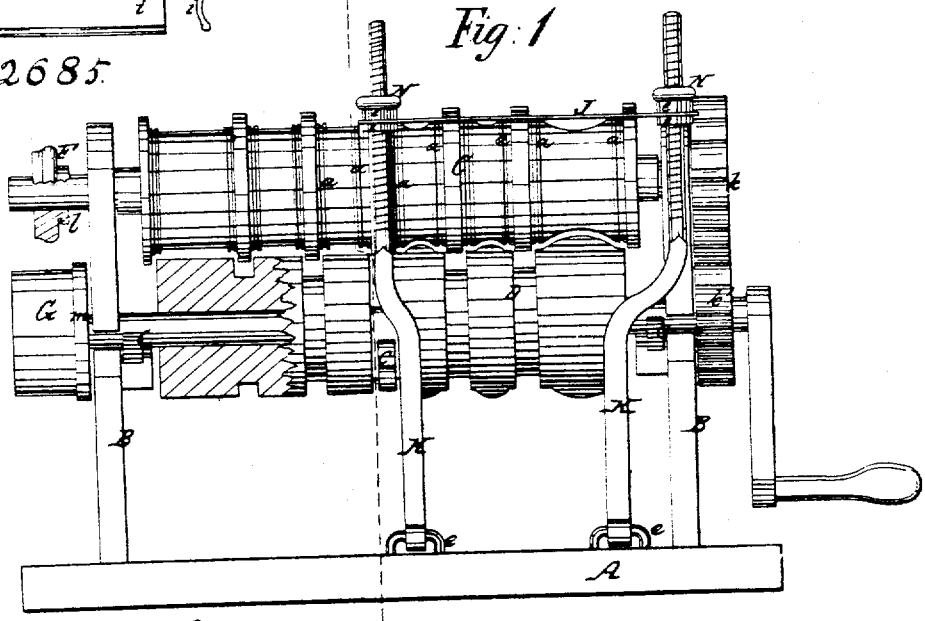
Fig: 3
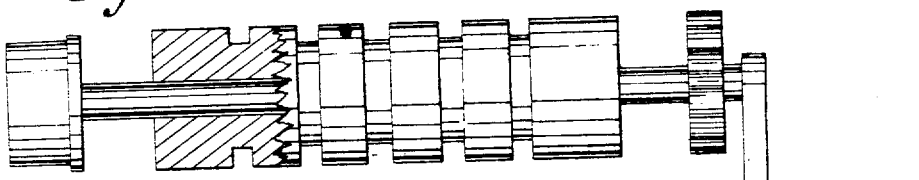
Fig: 6.
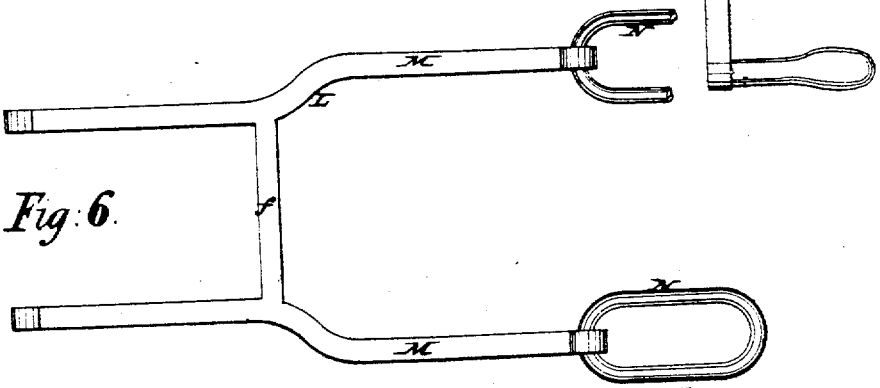
Witnesses:
T. A. Jackson.
Wm. Drewrn
Inventor:
C. C. Bellows
Per Munn & Co
Attys.

Examiner

2

BEST AVAILABLE COPY

United States Patent Office.

C. C. BELLOWS, OF NEW IPSWICH, NEW HAMPSHIRE.

*Letters Patent No.* 58,978, *dated October* 23, 1866; *reissue No.* 2,685, *dated July* 16, 1867.

IMPROVEMENTS IN CREASING, SLICKING, AND SKIVING LEATHER.

The Schedule referred to in these Letters Patent and making part of the same.

TO ALL WHOM IT MAY CONCERN:

Be it known that I, C. C. BELLOWS, of New Ipswich, in the county of Hillsborough, and State of New Hampshire, have invented a new and improved Machine for Creasing, Slicking, and Skiving Leather; and I do hereby declare that the following is a full, clear, and exact description thereof, which will enable others skilled in the art to make and use the same, reference being had to the accompanying drawings, forming part of this specification, in which—

Figure 1 is a front view of my invention.

Figure 2, a transverse vertical section of the same, taken in the line *x x*, fig. 1.

Figure 3, a detached view of a roller pertaining to the same.

Figure 4, a detached view of a skiving-knife pertaining to the same.

Figure 5, a detached view of a triple lever pertaining to the same.

Figure 6, a detached view of a portion of a clamp-frame pertaining to the same.

Figures 7, 8, 9, 10, and 11, detached views of the specimens of work performed by the machine.

Similar letters of reference indicate like parts.

This invention relates to a new and improved machine for creasing, slicking, and skiving leather, and it relates to an improved means for supporting the lower adjustable roller, whereby the latter is prevented from springing as the leather is drawn between the two rollers.

The invention also consists in a novel application of a skiving-knife, and also of the lower adjustable roller, and in the application of a saddle-skirt creasing device, all being arranged as hereinafter fully shown and described, whereby a very efficient device is obtained for the manufacture of leather straps for harnesses, and the creasing of saddle-skirts, &c., &c.

A represents a base or foundation, on which two uprights, B B, are secured, and C is a roller, the bearings of which are in the upper ends of the uprights B B, said roller C being grooved circumferentially, the grooves being of different widths, to suit the different widths of straps to be operated upon, and the bottoms of the grooves provided with projections *a*, to form creases in the straps. (See fig. 1.) D (figs. 1 and 2) represents a roller, which is turned with projections to fit into the grooves of the upper roller C, and this roller D has its bearings, *b*, in the arms *c* of a triple lever, E, said lever having its fulcrum at the upper end of an upright, F, and having an upright rod, G, passing through it, on the upper end of which there is a thumb-nut, H, with a spiral spring, I, interposed between said nut and the lever. This spring I has a tendency to keep the lower roller D up in contact with the upper roller C, and, if necessary or so desired, a weight may be applied to E, to assist the spring I in performing that function. The triple or three-armed lever E prevents the roller D from springing, the central arm effecting that result. This is an important feature, for it insures the perfect operation of the two rollers, they being kept parallel with each other. J represents a plate, having knives *d* attached to or formed on it. These knives fit in the upper parts of the grooves in the upper roller C, and have nearly a tangential position therewith. This plate J is fitted on the upper ends of the bars K K, the lower ends of which are bent in slightly hook-form, to fit into staples *e e* on the base or foundation A, the plate J being fitted between jam-nuts *e e* on the bars K K. L is a frame composed of two bars, M M, connected by a transverse bar, *f*, and having their lower ends curved and fitted in staples *g* on the base or foundation A, the upper ends of the bars M M having links N attached to fit over the upper ends of the bars K K, and retain or hold the knives *d* in proper position relatively with roller C. These knives *d* are used for skiving or cutting off leather strips *h*, which are fitted between the two parts *i i'* of the strap. (See figs. 8 and 9.) The straps for certain parts of harnesses are composed of a rounded part, *i*, a flat part, *i'*, and a filling, *h*, the two parts, *i i'*, being stitched together near their edges with the filling secured between them. The rounded parts *i* are formed by the grooves in the rollers C D, having respectively a concave and convex surface, and the flat parts formed by grooves having flat surfaces, both forms of grooves being shown in fig. 1. The power is applied to the lower roller D, and the two rollers are connected by gears *h h'*, one of which, *h*, on the upper roller C, has more teeth than the lower one, *h'*, on the lower roller D, in order that the upper roller may rotate a trifle slower than the lower one, and the work be thereby slicked or polished while being creased and raised or rounded. By having the lower roller D fitted on the arms of the lever E, and the uprights B B slotted, as shown at *a**, to admit of its

BEST AVAILABLE COPY passing underneath the roller C, said roller may be changed at pleasure to suit the different kinds of work required to be performed. On one side of the shaft or journal of the upper roller C there is fitted an adjustable creasing-wheel, F. This wheel is allowed to slide on the shaft or journal, and is secured at any desired point by a set-screw, *l*. On the shaft or journal of the lower roller D there is fitted a roller, G, having a flange, *m*, at its inner edge. This creasing-wheel and roller are designed for creasing saddle-skirts, and by moving or adjusting the wheel F on the shaft or journal of the upper roller, the crease may be made in the skirt at a greater or less distance from its edge, as may be desired. The skirt, as it passes between the creasing-wheel F and the roller G, has its edge pressed against the flange *m*, which serves as a bearing or guide.

This machine has been practically tested, and has been found to answer a good purpose.

Having thus described my invention, what I claim as new, and desire to secure by Letters Patent, is—

1. The combination of the slotted standards B, slotted triple-armed lever E, springs I, and rods G, arranged to operate with the roller D, when constructed and applied in the manner and for the purpose specified.

2. The plate J, having skiving-knives *d* attached to or formed on it, and applied to the upper roller C by means of the bars or clamp-frame, substantially as and for the purpose described.

3. The lateral adjustable creasing-wheel F, on the upper roller-shaft, operating with the flanged roller G, substantially as described for the purposes specified.

4. The combination and arrangement of two rollers of equal or unequal diameter, and connected by gears of equal or unequal diameter with the creasing-wheel F and flanged roller G, substantially as and for the purposes set forth.

C. C. BELLOWS.

Witnesses:
WM. F. MCNAMARA,
ALEX. F. ROBERTS.